United States Patent [19]  
Squire

[11] 3,919,155  
[45] Nov. 11, 1975

[54] SYNTHESIS OF AROMATIC AMINES BY REACTION OF AROMATIC COMPOUNDS WITH AMMONIA

[75] Inventor: Edward Noonan Squire, Glen Mills, Pa.

[73] Assignee: E. I. Du Pont de Nemours & Company, Wilmington, Del.

[22] Filed: Dec. 19, 1973

[21] Appl. No.: 429,025

Related U.S. Application Data

[63] Continuation-in-part of Ser. No. 99,637, Dec. 18, 1970, abandoned, which is a continuation-in-part of Ser. No. 22,715, March 25, 1970, abandoned.

[52] U.S. Cl. .......... 260/571; 260/288 R; 260/294.9; 260/296 R; 260/465 E; 260/558 R; 260/570 R; 260/574; 260/581
[51] Int. Cl.$^2$ ......................... C07C 85/18
[58] Field of Search ..................... 260/581, 296

[56] References Cited
UNITED STATES PATENTS 2,040,396   5/1936   Morrell et al. .............. 260/581 X
2,948,755   8/1960   Schmerling .................. 260/581
3,231,616   1/1966   Jones ....................... 260/581

FOREIGN PATENTS OR APPLICATIONS
553,988   3/1958   Canada ....................... 260/581

*Primary Examiner*—Lewis Gotts
*Assistant Examiner*—S. P. Williams

[57] ABSTRACT

An improved process for producing an aromatic amine is provided in which an aromatic compound is reacted with ammonia in the presence of a conditioned nickel/nickel oxide cataloreactant at a temperature of from about 150°C. to about 500°C. and at a pressure of from about 10 to about 1000 atmospheres and in the presence of from 1 mole percent to 250 mole percent of water based on the molar amount of the aromatic compound.

14 Claims, No Drawings

SYNTHESIS OF AROMATIC AMINES BY REACTION OF AROMATIC COMPOUNDS WITH AMMONIA

RELATED APPLICATIONS

This application is a continuation-in-part of copending application Ser. No. 99,637 filed on Dec. 18, 1970, which is in turn a continuation-in-part of application Ser. No. 22,715 filed on Mar. 25, 1970, all now abandoned.

BACKGROUND OF THE INVENTION

As is well known, arylamines have been made in a variety of ways including reduction of the corresponding nitro compound, reaction of a chloro compound with ammonia either alone or with catalysts such as copper salts, reaction of phenols with ammonia and zinc chloride at an elevated temperature and by the well-known Hofmann amide rearrangement with a hypohalite or halogen and a base. For some time, more direct methods of producing arylamines have been sought.

More recently, Canadian Pat. No. 553,988 issued on March 4, 1958 to Thomas describes a one-step process for the production of aromatic amines. One embodiment comprises contacting a mixture of benzene, ammonia and oxygen in the vapor phase with a platinum catalyst maintained at a temperature of about 1,000°C. In another embodiment, a mixture of benzene and ammonia is contacted in the vapor phase with a reducible metal oxide such as nickel oxide at a temperature of about 100°C. to 1,000°C. The benzene is directly converted to aniline as represented by the equation

wherein M represents the metal and MO represents the oxide thereof.

U.S. Pat. No. 2,948,755 issued on Aug. 9, 1960 to Louis Schmerling describes the preparation of aromatic amines by reacting an aromatic compound such as benzene with anhydrous ammonia in the presence of a compound of a group VI-B metal such as molybdenum, tungsten or chromium and a promoter consisting of an easily reducible metallic oxide such as an oxide of copper, iron, nickel, silver or gold at a temperature in the range from about 200° to 600°C. The easily reducible metallic oxide is stated to perform as a hydrogen acceptor to thus remove the byproduct hydrogen produced, causing the reaction to proceed in the desired direction.

An earlier reference, J. B. Wibaut, Berichte, 50, 541–6 (1917), reported the synthesis of aniline by passing benzene and ammonia through an iron tube packed with reduced nickel, iron, and asbestos at a temperature in the range of 550° to 600°C.

While the methods of these references do provide direct processes for the production of the aromatic amine, they do so in low conversions and yields of the aromatic compound to aromatic amine.

SUMMARY OF THE INVENTION

It has now been found that improved conversions of aromatic compounds and higher yields of aromatic amine can be achieved when the aromatic compound is reacted with ammonia in the presence of water at a temperature of from about 150°C. to about 500°C. and at a pressure of from about 10 to about 1,000 atmospheres and in the presence of a conditioned nickel/nickel oxide cataloreactant. The amount of water required to provide the improved conversion is in the range of 1 mole percent to 250 mole percent based on the molar amount of aromatic compound being reacted. This amount of water is to be distinguished from water which is formed as a by-product in the amination reaction.

By conditioned is meant that, prior to its use in the amination reaction, the nickel oxide component of the cataloreactant is partially reduced to elemental nickel in a reducing atmosphere such as hydrogen. The elemental nickel formed by this process is then partially oxidized back to nickel oxide in an oxidizing atmosphere such as oxygen, air or water.

DETAILED DESCRIPTION OF THE INVENTION

A. The Cataloreactant

The reaction between the aromatic compound and ammonia is an equilibrium reaction represented by the following equation using benzene as an example:

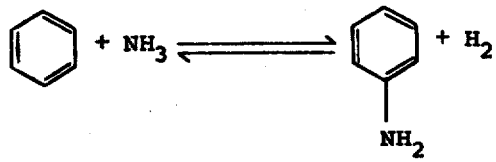

The mole ratio of ammonia/aromatic compound is preferably from 0.1 to 20, most preferably from 1.0 to 10, although any desired ratios may be employed.

The cataloreactants of the invention are nickel/nickel oxide compositions which function both as catalysts and as reactants in the amination of the aromatic compound. Specifically, the elemental nickel component catalyzes the reaction between the aromatic compound and ammonia while the nickel oxide component is the reactant. The nickel oxide is reduced to elemental nickel by the hydrogen formed during the reaction between the aromatic compound and ammonia. The preferred mole ratio of nickel to nickel oxide is 0.001 to 10, most preferably 0.01 to 1.

The cataloreactant of this invention is characterized by the fact that the size of the nickel crystallites varies from about 50 to 1000 A, preferably 80 to 250 A. If the crystallites are too large the activity of the catalyst is too low, and if the crystallites are too small unwanted side reactions take place because of overactivity.

The cataloreactant may be used alone or in a composition with a compound such as a carbonate or an oxide of another metal, particularly an oxide which forms a cubic crystal structure such as zirconium. Whenever used herein, the term cataloreactant is intended to include cataloreactant compositions containing the oxides and carbonates suggested herein. Other oxides and carbonates of this type that can be used with the cataloreactant include those of strontium, barium, calcium, magnesium, zinc, iron, titanium, silicon, aluminum, thorium, uranium, cerium or one of the alkali metals. These may be used along with the nickel/nickel oxide composition or in conjunction with zirconium oxide. Combinations with certain clays such as kieselguhr can also be used. The compounds mentioned function in the nature of a support or as a promoter to enhance the cataloreactant properties of the nickel/nickel oxide system and prevent reduced nickel crystallite coalescence by physically separating the crystallites. The mole ratio of the total nickel in the form of nickel and nickel oxide in the cataloreactant to the other oxides and carbonates, particularly zirconium oxide expressed in terms of total nickel:zirconium or other oxide or carbonate metal ion is from 0.1 to 100, preferably 0.3 to 20.

Among the compounds mentioned, those of strontium, barium, calcium and the alkali metals are considered to be present in the cataloreactant predominantly as carbonates. In view of the hydrolytic conditions that obtain in the preparation of the cataloreactant, in some instances the carbonates may be hydrolyzed to the corresponding oxides or hydrous oxides. The compounds of the other metals mentioned, that is, compounds of zirconium, magnesium, zinc, iron, titanium, aluminum, silicon, cerium, thorium and uranium are considered to be present in the catalyst composition as the oxide or hydrous oxide.

The cataloreactants of this invention may be prepared by any suitable method. Generally, the system is precipitated from a solution of a nickel compound, preferably with a zirconium compound, such as the nitrate salt, by addition of a solution of a base such as ammonium carbonate, sodium hydroxide, lithium hydroxide, potassium hydroxide, ammonium hydroxide, sodium carbonate, sodium bicarbonate, potassium carbonate and the like and mixtures thereof. Additionally any nickel and zirconium salt or ester which can react with an oxygen source, such as oxygen, water or part of the salt anion to give oxides or hydrous oxides can be used.

After the precipitation of the components of the cataloreactant in the form of the oxide or hydrous oxide, the precipitate is filtered, washed, dried, reduced with hydrogen and exposed to a suitable amount of air or oxygen or optionally water until the desired oxidation product is achieved. The resulting solid product has surface area of at least 1.35 square meters per gram, preferably 1.35 to 300 square meters per gram, most preferably 20 to 200 square meters per gram.

In the conditioning operation, the cataloreactant is reduced by being exposed to hydrogen at a temperature between about 300°C. and 600°C., preferably 350°C. to 425°C. The hydrogen pressure can vary from 0.1 atmosphere to 10 atmospheres and preferably 0.1 to 2 atmospheres of pressure are employed. From about 10 percent to 90 percent of the nickel oxide and preferably 25 percent to 60 percent is reduced to metallic nickel in this step. The cataloreactant is then oxidized by treatment with a gas containing from about 0.1 percent to about 21 percent of oxygen, preferably 1 percent to 5 percent, at 30°C. to 800°C. preferably 100°C. to 500°C., and at 0.1 atmosphere to 600 atmospheres, preferably 1 to 300 atmospheres pressure, preferably for the length of time necessary to achieve a Ni/Nio mole ratio of 0.001 to 10, most preferably 0.01 to 1.

B. The Amination

The conditions under which the reaction between ammonia and the aromatic compound is carried out depend somewhat on the particular reactants. In general, temperatures of from about 150°C. to about 500°C., preferably 200° to 500°C., and pressures of from about 10 atmospheres to about 1,000 atmospheres, preferably 30 to 750 atmospheres will be employed.

The amination process may be carried out either batchwise or in a continuous operation. In a batch-type operation, the cataloreactants of this invention are used in such quantities that the weight ratio of the cataloreactant, to the aromatic compound is from 0.01 to 10, preferably 0.2 to 3. Any suitable apparatus in which the reactants can be combined and mixed such as an agitated autoclave or a pressure vessel may be used as the reactor. Preferably, the reactor is heated to the reaction temperature before the amination reactants are introduced. Once the reactor contains the cataloreactant, ammonia and the aromatic compound to be aminated, it is sealed and the reaction is allowed to proceed to the degree of conversion desired. Thereafter, the apparatus and the contents are cooled to room temperature or lower, excess ammonia is vented and the aminated aromatic reaction product is separated from unreacted aromatic compounds, the cataloreactant and by-products by conventional means such as distillation, crystallization, and the like.

In a continuous operation, the process may be carried out in any suitable apparatus that will permit a contact time between the amination reactants and the catoloreactant of from two seconds to twenty minutes, preferably 30 seconds to 8 minutes. Some such suitable apparatus would include fixed bed reactors or packed vessels or coils, into which the cataloreactant, ammonia and the aromatic compound can be charged and the aromatic compound and ammonia can be passed through a cataloreactant bed. A moving bed operation may also be employed in which the reaction bed and the reactants either pass concurrently or countercurrently to each other. Still another type of continuous operation which may be employed is a fluidized bed or slurry type in which the cataloreactant is carried into the reactor as a slurry in one or more of the reactants.

In either the batch or continuous type of reactor the aromatic compound and the ammonia may be introduced separately or as a single mixed stream. The cataloreactant may either be regenerated intermittently or continuously with oxygen or an oxygen containing gas such as air.

In the preferred embodiment of this invention, the amination reaction is carried out at a temperature in the range of about 250°C. to about 500°C. and at a pressure ranging from about 30 atmospheres to about 700 atmospheres.

Any aromatic compound with which ammonia is miscible at the temperature and pressure of the reaction and which comes into intimate molecular contact with the cataloreactants of this invention may be directly aminated with ammonia as described herein. By intimate molecular contact is meant that, at the reaction temperature and pressure, the molecules of each reactant are in contact, on a molecular basis, with the cataloreactants of this invention. Some such suitable aromatic compounds include benzene, naphthalene, anthracene, phenanthrene, pyridine, quinoline, isoquinoline, mono- or di- substituted counterparts of any of them and the like, preferably benzene or pyridine.

Other aromatic compounds which may also be aminated in accordance with this invention include those having the formula $(X)_m(Y)_n$ wherein X is benzene or pyridine, $m$ is 1 or 2, $n$ is 0, 1 or 2, and Y is alkyl having one to six carbon atoms such as methyl, ethyl, propyl, butyl, amyl and hexyl, including cycloalkyl such as cyclohexyl and cyclopentyl; halogen such as fluoro and chloro; nitrile; hydroxy; $CONH_2$, alkoxy having one to six carbon atoms such as methoxy, ethoxy, propoxy, butoxy, and hexoxy including cycloalkoxy such as cyclohexoxy and cyclopentoxy; aryloxy such as phenoxy; amino including primary, secondary and tertiary amino wherein the secondary amino groups contain alkyl having one to five carbon atoms or aryl such as phenyl; aralkyl such as benzyl, including mono or dialkyl substituted aralkyls, wherein the alkyl groups contain one to five carbon atoms such as 2-methyl benzyl, 3-ethyl benzyl, 2,3-dimethyl benzyl and the like; with the proviso that when Y is aryloxy, a secondary or tertiary arylamine or an aralkyl, $n$ is 1. When $n$ is 2, the substituents Y may be the same or different. Any of the substituents Y may be contained on the naphthalene anthracene, phenanthrene, quinoline and isoquinoline nucleus as mentioned above.

Some more specific aromatic compounds which may be aminated directly with ammonia include biphenyl, bipyridine, 4,4'-dichlorobiphenyl, toluene, o, m and p-xylene, aniline, chlorobenzene, fluorobenzene, 1,4-dichlorobenzene, ethylbenzene, anisole, 3-chloropyridine, 4-propylpyridine, hexylbenzene, 4-ethoxypyridine, phenoxy benzene, 4-phenoxypyridine, 3-aminopyridine, dimethylamino benzene, 1,4-diamino benzene, 2,4-diaminopyridine, 4-cyanopyridine, benzamide, benzonitrile, phenetole, o, m, p-dimethyl benzene, 1-chloronaphthalene, 2,5-dichloronaphthalene, 1-fluoroanthracene, 2-methylphenanthrene, diphenyl methane, 4-phenyl-2-methyl pyridine, xylyl methyl benzene, 2(bisphenyl) propane, phenoxy benzene, N,N-diethyl amino benzene, 4-(N-phenylamino)pyridine, N-pentylamino benzene, m-phenylenediamine, 3-amido pyridine, 1-methyl-3-ethyl benzene, o, m, p-chloroaniline, o, m, p-chlorobenzonitrile, 2-chloro-4-cyanopyridine, p-methoxy benzamide; cyclohexyl benzene, 4-cyclopentylpyridine, 4-(N-methyl-N-phenyl) amino pyridine, 3-hydroxy pyridine, 1-hydroxy-3-chlorobenzene, 3-methoxy quinoline, 5-cyano isoquinoline, 4,4'-dicyanodiphenyl, 4-hydroxy-4'-fluorobiphenyl, 1,4-dichloroanthracene, 2,7-dihydroxy phenanthrene, 1-chloro-5-amido naphthalene, 5-phenoxy isoquinoline, 3-chloro-4-fluoroquinoline, 2-pentoxy-7-hydroxy phenanthrene, 1-(2,3-dimethyl phenyl) naphthalene, 1,4-dichloronaphthalene, methylisopropyl phenanthrene, 9,10-dichloroanthracene, dihydroanthracene, 2,3-dimethylanthracene, 9-ethylanthracene, aminoquinoline, aminophenylmethylquinoline, benzoquinoline, chloroquinoline, dimethylquinoline, quinolinol, methoxyquinoline, α-methylquinoline, cyanoquinoline, 2-, 3-, 4-methylisoquinoline, 2-, 3-, 4-methyl pyridine, 3-benzylpyridine, 3,5-dimethyl pyridine, 3-ethyl-5-methyl pyridine, 4-hydroxy pyridine, 3-methyl-5-ethyl pyridine, 4-propyl pyridine, α-naphthylamine, 1-benzylnaphthalene, 1 or 2-chloronaphthalene, any of the naphthalene diamines, anthradiamines, dichloroanthracenes, dimethyl anthracenes, naphthalene diols, dichloronaphthalenes, and dimethylnaphthalenes, 1-ethoxynaphthalene, 1 or 2-fluoronaphthalene, isopropylmethyl naphthalene, 1 or 2 ethyl naphthalene, 1-methylisopropylnaphthalene, 1-phenylnaphthalene, naphthamide and the like as well as any other compounds which come within the definition and formula set out hereinbefore which will occur to those skilled in the art.

The preferred aromatic compounds for the amination reaction are diphenyl ether, its monoamino derivatives, benzene, aniline and pyridine with the production of mono and diamino diphenyl ethers, aniline, diamino benzene and 2-amino pyridine as the preferred objective. Benzene may be aminated to aniline which in turn may be aminated to phenylene diamines either with or without additional benzene feed to the reactor.

Using phenylene diamine as an illustration, it will be seen in the examples that depending upon the particular cataloreactant and reaction conditions employed an aromatic diamine product comprising predominantly meta-phenylenediamine or predominantly ortho-phenylenediamine is obtained. In general, cataloreactants and reaction conditions leading to higher conversion of the aromatic monoamine to aromatic diamine favor the predominant production of meta-phenylenediamine; those leading to a lower conversion of aromatic monoamine to aromatic diamine favor the predominant production of ortho-phenylenediamine. The incorporation of carbonates or oxides of strontium, magnesium, cerium, and the alkaline earth metals and use of higher cataloreactant to aromatic monoamine ratios are also observed to favor meta-phenylenediamine production. A lower amination temperature appears to favor ortho-phenylenediamine production. When a mixture of an aromatic compound containing no amino groups and its monoamino derivative is to be aminated such as, for example, diphenyl ether, and a monoamino derivative thereof, it is preferred that the molar ratio of the monoamino derivative to the non-amino containing aromatic compound is from about 1:2 to 2:1.

In a preferred embodiment of this invention the amount of water charged into the reactor when a monoamine such as aniline is to be produced is in the range of 5 mole percent to 35 mole percent based on the molar quantity of the aromatic compound being aminated. For the production of polyamines such as the phenylenediamines, the preferred amounts of water to be added are in the range of 5 mole percent to 175 mole percent.

For the amination of benzene to aniline the preferred cataloreactant is a metal/metal oxide system based on nickel, nickel oxide and zirconium oxide; for the amination of aniline to the diamine the preferred system is based on nickel, nickel oxide, strontium oxide and zirconium oxide.

The aromatic amines prepared by the process of this invention are useful in any application in which prior art aromatic amines have been employed such as, for example, in the preparation of isocyanates used to react with polyols in the production of urethanes.

The invention is further illustrated but is not intended to be limited by the following examples in which all parts and percentages are by weight unless otherwise specified.

EXAMPLE 1

Amination of Benzene

A nickel/nickel oxide/zirconium oxide composition is prepared as follows:

Ni(NO$_3$)$_2$.6H$_2$O, 290.8 g. (1 g. at. wt. Ni), and zirconyl nitrate, 124.2 g. (0.30 g. at. wt. Zr) are dissolved in 3000 ml. of distilled water. To this stirred solution there is added a solution consisting of 163 g. (1.4 moles) of (NH$_4$)$_2$CO$_3$.H$_2$O dissolved in 1500 ml. of distilled water. The mixture is stirred for 1 hour and then the precipitate is filtered and washed three times with 500 ml. portions of distilled water at room temperature. The green colored solid precipitate is placed in a circulating air oven for 113 hours at 110°C. The weight of the green solid is 144 g. at this stage. This is broken up largely into 1/8 inch to 1/4 inch particles and 36 g. portions of this are charged into four vertically mounted quartz tubes situated in 12 inch split tube furnaces. A 90 ml./min. $N_2$/10 ml./min. $H_2$ stream is passed up through the solid particles. At 10 minute intervals the hydrogen concentration is increased in steps to 75 $N_2$/25 $H_2$, 50 $N_2$/50 $H_2$, 25 $H_2$/75 $H_2$, 10 $N_2$/90 $H_2$, and $OH_2$/100 $H_2$. The temperature, as measured by a platinum sheathed thermocouple deeply immersed in the solid particles, is increased to 380°C. over about a one-half hour time period except for a short exotherm period. The temperature is held for 1 hour at 380°C. with a flow of 100 ml./min. $H_2$ into the tube. The furnace is then turned off and the tube is gradually cooled to room temperature under a 100 ml./min. $N_2$ gas flow. The four essentially black, granular to fine powder batches are transferred in the presence of air to a bottle and the bottle is capped. The bottle becomes warm as a result of the oxidation of its contents. The bottle is placed on a Fisher Mixer overnight in order to adequately blend the four batches, and distribute the air among the particles. The cataloreactant is then analyzed.

Analysis: Total Nickel, 47.69%; Reduced Nickel as Nickel Metal, 2.63%.

A reaction mixture of 20 g. of the reduced nickel oxide/zirconium oxide composition described above, 23.4 g. (0.3 mole) of benzene, 11.9 g. (0.7 mole) of ammonia and 1.8 g. (0.1 mole) of water is introduced into a 110 ml., mild steel shaker tube, sealed and heated at 350°C. for 12 minutes under autogenous pressure which is found to be in the range of 300–400 atmospheres in typical runs. The tube is cooled, the contents vented and removed. From gas chromatographic analysis it is determined that 2.36 grams of aniline are produced. After the amination the cataloreactant analyzed:

Total Ni 45.66%
Reduced nickel as nickel metal 2.44%

As a control, the experiment described above is repeated except that water is omitted from the charge to the reactor. There are obtained 1.87 grams of aniline (Water content of benzene used — 0.016%).

After the amination the cataloreactant analyzed:

Total Ni 46.74%

-continued
Reduced nickel as nickel metal 4.15%

EXAMPLES 2–5

Aminations of Benzene — Variations in Cataloreactant Preparation

The effect of water on amination of benzene is further illustrated in these examples, with particular reference to variations in the cataloreactant preparation. The cataloreactant preparation and amination reactions are carried out as described in Example 1 except for the changes indicated by the notes in the legent. The numerical designations under cataloreactant composition refer to the molar quantities of the metal ingredients (usually nitrates unless otherwise specified) used in making the catalysts.

TABLE I

AMINATION OF BENZENE

| Example | Reactants (Moles) $C_6H_6$ | $NH_3$ | $H_2O$ | Cataloreactant Composition | Grams | Conditions (°C./Mins.) | Conversion Value[e] |
|---|---|---|---|---|---|---|---|
| 2A | 0.3 | 0.7 | — | Ni/Zr(1/0.3)[a] | 15 | 350/12 | 2.34 |
| B  | 0.3 | 0.7 | .05 | "      | "  | "       | 2.60 |
| 3A | 0.3 | 0.7 | — | Ni/Zr(1/0.3)[b] | 10 | 350/12 | 2.11 |
| B  | 0.3 | 0.7 | 0.17 | " | " | " | 2.39 |
| 4A | 0.3 | 0.7 | — | Ni/Zr(1/0.3)[c] | " | " | 1.92 |
| B  | 0.3 | 0.7 | .025 | " | " | " | 2.24 |
| C  | 0.3 | 0.7 | .05 | " | " | " | 2.30 |
| 5A | 0.3 | 0.7 | — | Ni/Zr(1/0.3)[d] | 40 | 350/12 | 1.9 |
| B  | 0.3 | 0.7 | 0.1 | " | " | " | 2.93 |

Legend:
[a] — Cataloreactant precipitated with sodium carbonate solution.
[b] — Cataloreactant precipitated with ammonium carbonate solution.
[c] — Helium used in place of nitrogen in reduction of oxides.
[d] — Oxides reduced at 390°C. rather than at 380°C.
[e] — Grams of aniline obtained.

EXAMPLE 6

Amination of Aniline

A partially reduced nickel oxide composition is prepared by dissolving (0.5 g. at. wt. Ni) 145.4 g. Ni(-$NO_3)_2.6H_2O$, Sr($NO_3)_2$, 5.3 g. (0.025 g. at. wt. Sr), and zirconyl nitrate 41.4 g. (0.1 g. at. wt. Zr) in 1500 ml. of distilled water. To this stirred solution there is added 78.6 g. (0.69 mole) of ($NH_4)_2CO_3.H_2O$ dissolved in 750 ml. of distilled water. The mixture is stirred for 1 hour at ambient temperature and the green precipitate that results is filtered and washed with 3–250 ml. portions of distilled water. The precipitate is dried for 16 hours at 105°C. in a circulating air oven and at this stage weighs 71.1 g. This is divided into 2 parts each of which is reduced and oxidized in a manner similar to that of Example 1.

As described in Example 1, a 110 ml. mild steel shaker tube is charged with 0.2 mole aniline, 10 g. of the oxide described above, 0.3 mole distilled water, and 0.9 mole $NH_3$. The shaker tube is heated for 7 minutes at 350°C. under autogenous pressure (300–400 atmospheres in typical runs) and then cooled to room temperature. The excess ammonia is vented and the liquid phase is separated from the nickel/nickel oxide by filtration. From gas chromatographic analysis it is determined that an amount of 1.38 grams of phenylenediamines is obtained. A control experiment carried out as described above except that no water is added to the reactor gives 0.50 gram of the diamines. (Water content of aniline material is approximately 0.032%).

EXAMPLE 7

Amination of Aniline-Cataloreactant Composition — Ni/Mg (1/.2/.3)

A solution is prepared by dissolving 290.8 g. Ni(-NO$_3$)$_2$.6H$_2$O, 51.3 Mg(NO$_3$)$_2$.6H$_2$O, and 82.8 g. zirconyl nitrate in 3000 ml. distilled water and this is treated with a solution made by dissolving 176.2 g. ammonium carbonate in 1500 ml. distilled water in the manner described in Example 1. The stirring, filtration, washing operations are likewise carried out in the manner of Example 1. The green, paste-like material is dried 16 hours in a circulating air oven and at the end of this time the green solid weighs 180.6 g.

The green solid is reduced in four portions as described in Example 1 with the peak temperature observed to be 470°C. during the exotherm period. After cooling to room temperature under nitrogen the four batches are transferred to an 8 ounce glass jar in the presence of a limited amount of air and this is tumbled on the Fisher Mixer overnight. The resulting charcoal black granular to fine powder product weighs 88.5 g.

A 110 ml. mild steel shaker tube is charged with 40 g. of the above product, 18.6 g. aniline, 3.6 g. distilled water, 17 g. ammonia and heated 30 minutes at 350°C. with agitation in the same manner as described in Example 1. Upon cooling to room temperature the tube contents are found to contain 2.55 g. phenylenediamines.

EXAMPLES 8 – 13

Aminations of Aniline - Various Cataloreactant Compositions

The effect of water on the amination of aniline in the presence of various nickel/nickel oxides is illustrated in Table II. The reactions are carried out in a 110 ml. mild steel shaker tube following in general the procedure outlined in Example 1. The numerical designations under Cataloreactant Composition refer to the molar quantities of the metal ingredients (usually nitrates unless otherwise specified) used in making the cataloreactants.

EXAMPLE 14

Cataloreactant Preparation by Decomposition of Nickel Compound

Two quartz tubes as described in Example 1 are each charged with approximately 50 g. of nickel formate. Nitrogen at 50 ml. per minute is run through the tubes and the tube contents are slowly brought to 380°C. over a 5-hour period. They are held at 380°C. for 1 hour and then cooled to 52°C. and 80°C. at which temperatures 10 ml. air per minute are fed in the nitrogen stream for 25 minutes. There is no observable exotherm and the tube contents, a brown to gray-black powder weighing 28.9 g. is transferred to a glass jar, again without evidence of any exotherm. A 110 ml. mild steel shaker tube is charged with 9 g. of the above powder, 18.6 g. aniline, 1.8 g. distilled water, 17 g. ammonia and the tube is heated 7 minutes at 350°C. with agitation as described in Example 1. After cooling to room temperature and venting the excess ammonia the tube contents are found to contain 0.855 g. phenylenediamines

EXAMPLE 15

Amination of Aniline

A cataloreactant is prepared from 290.8 g. Ni(-NO$_3$)$_2$.6H$_2$O, 42.3 g. Sr(NO$_3$)$_2$ and 82.8 g. zirconyl nitrate according to the method of Example 6. The oven dried, solid hydrous oxides weigh 160 g. Part of this, 81.8 g., is reduced in 2 portions as illustrated in Example 6 except that the temperature setting is held at 150°C. for one-half hour and the final part of the reduction is carried out for 1 hour at 400°C. instead of at 380°C. The maximum temperature recorded during the reduction is 466°C.

After cooling to room temperature under 100 ml. nitrogen per minute, 5 ml. air are introduced into the nitrogen stream and at half hour intervals this is increased to 20 ml. and 40 ml. per minute. (The maximum temperature observed is 68°C.). After one-half hour at a gas flow of 100 ml. nitrogen - 40 ml. air per minute, the gas stream is shut off and the tube contents are transferred to a glass jar. There is no evidence of an

TABLE II

AMINATION OF ANILINE

| Example | Reactants (moles) φNH$_2$ | NH$_3$ | H$_2$O | Cataloreactant Composition[d]grams | Conditions °C./minutes | Conversion Value[e] |
|---|---|---|---|---|---|---|
| 8A | 0.2 | 1.0 | — | Ni/Sr/Zr(1/.05/.2)[a] | 10 | 350/7 | .38 |
| B | 0.2 | 1.0 | 0.2 | " | 10 | " | .560 |
| C | 0.2 | 1.0 | 0.3 | " | 10 | " | .716 |
| 9A | 0.2 | 1.0 | — | Ni/Zr(1/.2)[b] | 10 | 350/7 | .352 |
| B | 0.2 | 1.0 | 0.2 | " | 10 | " | .445 |
| C | 0.2 | 1.0 | 0.3 | " | 10 | " | .521 |
| 10A | 0.2 | 1.0 | — | Ni/Sr/Zr(1/.1/.2)[a] | 20 | 350/7 | .738 |
| B | 0.2 | 1.0 | 0.1 | " | 20 | " | 1.04 |
| C | 0.2 | 1.0 | 0.2 | " | 20 | " | 1.38 |
| 11A | 0.2 | 1.0 | — | Ni/Zr(1/.2)[c] | 20 | 350/7 | .967 |
| B | 0.2 | 1.0 | 0.1 | " | 20 | " | 1.28 |
| C | 0.2 | 1.0 | 0.2 | " | 20 | " | 1.29 |
| 12A | 0.2 | 1.0 | — | Ni/Zr(1/.2) | 17.8 | 350/10 | .562 |
| B | 0.2 | 1.0 | 0.2 | " | 17.9 | 350/10 | 1.22 |
| 13A | 0.2 | 1.0 | — | Ni/Sr(1/.05) | 10 | 350/7 | .485 |
| B | 0.2 | 1.0 | 0.025 | " | 10 | 350/7 | .744 |

Legend:
[a] — precipitated cataloreactant washed with 2% NaOH solution;
[b] — with 3% Ba(OH)$_2$;
[c] — with Sr(OH)$_2$.
[d] — molar ratio of metal compounds, usually nitrates, used to make cataloreactant system.
[e] — grams of phenylenediamine obtained.

exotherm when this transfer is made in the presence of air. The charcoal black granular to fine powder product weighs 53.1 g.

A 350 ml. shaker tube is charged with 10 g. of the above product, 9.3 g. aniline, and 5 g. of ammonia and heated 15 minutes at 350°C. with agitation as described in Example 6, under autogenous pressure which ranges from 30–40 atmospheres. After cooling and venting the excess ammonia, the tube contents are found to contain 0.0780 g. phenylenediamine.

The same experiment is repeated except that 1.8 g. (0.1 mole) distilled water is also included in the charge. The reaction yields 0.008 g. of phenylenediamines.

In another experiment the water charge is increased to 2.7 g. (0.15 mole). The reaction yields 0.1125 g. of phenylenediamines.

For comparison, amination of aniline as described in Example 6 with the same cataloreactant but at a higher pressure yields 1.38 grams of phenylenediamine when the reaction is carried out in the presence of water and 0.50 gram of phenylenediamine when the reaction is carried out in the absence of additional water.

EXAMPLE 16

Amination of Aniline

Cataloreactant-Ni/Sr/Zr(1/0.2/0.2) - (Meta Directing)

A solution containing 290.8 g. Ni(NO$_3$)$_2$6H$_2$O, 42.3 g. Sr(NO$_3$)$_2$ and 82.8 g. zirconyl nitrate in 3,000 ml. distilled water is mixed under good agitation with a solution of 175.6 g. ammonium carbonate in 1,500 ml. distilled water in the same manner as described in Example 1. The resulting precipitate after filtering and washing is dried for 16 hours at 75°C. in a circulating air oven to yield 189.6 g. of solid materials.

The solid cake-like material is broken up into ⅛ inch to ¼ inch granules with some fines and is then reduced as described in Example 1 except that the nitrogen-hydrogen gas stream is bubbled through water at room temperature before entering the reduction tube; 0.9 g. of water is taken up by the nitrogen-hydrogen gas mixtures.

After cooling to room temperature under nitrogen the reduced material is poured through air into a glass jar with a limited amount of air. capped and mixed overnight on a Fisher Mixer prior to using in the following run.

A 110 ml. mild steel shaker tube is charged with 18.6 g. aniline, 3.6 g. distilled water, 20 g. of the above product, 17 g. ammonia, and heated 7 minutes at 350°C. with agitation according to the method of Example 1. After cooling the tube to room temperature and venting the excess ammonia the tube contents are found to contain 1.27 g. of phenylenediamines. The phenylenediamine isomer distribution is by weight 74.4% meta-, 23.7% ortho-, and 1.9% para-phenylene diamine.

EXAMPLE 17

Amination of Aniline

Catyloreactant-Ni/Sr/Zr (1/0.1/0.2) - (Meta Directing)

A solution containing 290.8 g. Ni(NO$_3$)$_2$.6H$_2$O, 21.2 g. Sr(NO$_3$)$_2$, and 82.8 g. zirconyl nitrate in 3,000 ml. distilled water is mixed under good agitation with a solution of 163 g. ammonium carbonate in 1500 ml. distilled water as described in Example 1. The resulting precipitate after filtering and washing is dried 16 hours in a circulating air oven to yield 166.6 g. of green solid material. This is broken up largely into ⅛ inch - ¼ inch particles with some fines and is reduced in 4 portions following the procedure of Example 1, the maximum recorded temperature during an exotherm being 480°C. After cooling to room temperature under 100 ml. nitrogen per minute the four portions (91.4 g.) are combined in a glass jar with air, during which time an exotherm is again observed. The portions are mixed for 3 hours on a Fisher Mixer prior to being used in the following experiment.

A 110 ml. mild steel shaker tube is charged with 40 g. of the above product, 18.6 g. aniline, 3.6 g. distilled water, 17 g. ammonia, and heated 7 minutes at 350°C. with agitation as described in Example 1. The reaction product is found to contain 2.17 g. phenylenediamines, comprising by weight 21.4% ortho-, 4.0% para-, and 74.6% meta-phenylenediamine.

EXAMPLE 18

Amination of Aniline

Cataloreactant-Ni/Fe (0.5/0.3) (Ortho Directing)

A solution of 145.4 g. Ni(NO$_3$)$_2$.6H$_2$), and 121.2 g. Fe(NO$_3$)$_3$.9H$_2$O in 1500 ml. of distilled water is mixed with a solution containing 119.9 g. ammonium carbonate in 750 ml. of distilled water. The resulting precipitate is filtered, washed with three 250 ml. portions of distilled water and dried in a circulating air oven for 16-¼ hours at 105°C. The resulting green solid weighing 92.7 g. is broken up by means of a mortar and pestle largely into ⅛ inch to ¼ inch granules and some fines and is reduced in the apparatus described in Example 1 according to the following procedure:

A charge of 92.7 g. of the above material is charged into the reduction tube, which is fed with a gas mixture of 90 ml. N$_2$, 10 ml. H$_2$ per minute. With the temperature regulator set at 150°C. at 10 minute intervals over 1 hour the hydrogen concentration is stepwise increased from 90 ml. N$_2$/10 ml. H$_2$ to 75 ml. N$_2$/25 ml. H$_2$ to 50 ml. N$_2$/50 ml. H$_2$ to 25 ml. N$_2$175 ml. H$_2$ to 100 ml. H$_2$/minute. The maximum recorded bed temperature is 200°C. during an exotherm period. The temperature regulator is then set at 400°C. the maximum bed temperature recorded is 492°C. during a short exotherm period. The bed is held at 400°C. for 1 hour including the time during which the exotherm occurs. Nitrogen gas, 100 ml./minute is then introduced into the tube and the hydrogen flow is stopped. The tube is cooled to room temperature and the contents then poured through air into a glass jar containing air. The charcoal black granular to fine material warms significantly during this contact with air. The product weight is 55.6 g.

A 110 ml. steel shaker tube is flushed with nitrogen and charged with 18.6 g. aniline. 10 g. of the above product, 1.8 g. distilled water and 17 g. ammonia, following the procedure of Example 1 and heated at 350°C. for 7 minutes. The tube contents are found to contain 0.86 g. phenylenediamines comprising by weight 63.2% ortho-, 3.8% para- and 33.0% metaphenylenediamine.

EXAMPLE 19

Amination of Aniline

Cataloreactant-Ni/Sr/Zr (1/0.2/0.2) - Effect of Temperature during Amination (Ortho and Meta Directing)

A solution of Ni(NO$_3$)$_2$.6H$_2$O, 290.8 g., Sr(NO$_3$)$_2$, 42.3 g. and zirconyl nitrate, 82.8 g., in 3,000 ml. distilled water is mixed with a solution of 171 g. ammonium carbonate in 1500 ml. distilled water following the procedure of Example 1. The resulting precipitate is filtered, washed and dried for 17 hours at 77°C. in a circulating air oven to give 182.8 g. of a green solid. This solid is broken up and one half of the solid, 91.4 g., is reduced by hydrogen in two portions. The reduction is carried out as in Example 1 except that the hydrogen/nitrogen concentrations are changed at 15 minute intervals, the temperature regulator is set at 400°C. instead of 380°C., and the temperature is held at 400°C. with hydrogen at 100 ml./minute for 1½ hours. The maximum temperature recorded during the reduction is 472°C.

After cooling the reduced material under 100 ml. nitrogen per minute to 35°–38°C., air at 2 ml./minute is introduced into the nitrogen stream for 30 minutes, then increased to 5 ml. for 30 minutes and then 10 ml. for 17 minutes. The second portion is treated with additional air, 20 ml./minute, for 30 minutes, and 40 ml./minute for another 30 minutes. The maximum temperature recorded during the aeration is 65°C. The resulting 24.7 g. first portion and 24.2 g. second portion are combined in a glass jar in the presence of air and mixed well before use in the following experiments.

A 110 ml. steel shaker tube is charged with 10 g. of the above product, 18.6 g. aniline, 2.7 g. distilled water and 17 g. ammonia, heated 30 minutes at 250°C. with agitation, cooled and the excess ammonia vented, following the Example 1 procedure. The tube contents are found to contain 0.218 g. of phenylenediamines. The product comprises by weight 93.1% ortho-, 1.7% para-, and 5.2% metaphenylenediamine.

The experiment is repeated except that the temperature is held at 350°C. instead of 250°C. The tube contents are found to contain 0.82 g. phenylenediamines. The phenylenediamine isomer distribution by weight is 37.5% ortho-, 4.8% para-, and 57.7% meta-phenylenediamine.

EXAMPLE 20

Amination of Aniline

Cataloreactant-Ni/Sr/Zr (1/0.05/0.2) - NH$_4$F Wash - (Ortho Directing)

A solution of Ni(NO$_3$).6H$_2$O, 290.8 g. Sr(NO$_3$)$_2$, 10.6 g. and zirconyl nitrate, 82.8 g., in 3000 ml. distilled water is mixed with a solution of ammonium carbonate, 157.2 g., in 1500 ml. distilled water according to the procedure of Example 1. The resulting precipitate is filtered, washed twice with water and finally with a solution of 20 g. ammonium fluoride in 500 ml. distilled water. After drying the green paste-like material for 54 hours in a circulating air oven at 85°C., 148.2 g. of a green solid are obtained. This is broken up and reduced in two portions, according to the procedure of Example 1, with the temperature regulator set at 380°C. at the start of the reduction, and reduction for 1 hour at 380°C. and 1 hour at 480°C. with 100 ml. hydrogen per minute passing into the tube. The reduced material is cooled to room temperature under 100 ml. nitrogen per minute and the two portions are combined in a glass jar in a limited amount of air. The reduced, partially reoxidized granular to fine powder weighing 90.6 g. and having a black color with occasional green particles, is mixed for 30 minutes on the Fisher mixer.

A 110 ml. mild steel shaker tube is charged with 10 g. of the above product, 18.6 g. aniline, 1.8 g. H$_2$O and 17 g. ammonia and then heated 10 minutes at 350°C. under autogenous pressure with agitation as described in Example 1.

After cooling the tube and venting the excess ammonia the tube contents are found to contain 0.464 g. phenylenediamine comprising by weight 82.4% ortho-, 0.5% para-, and 17.1% meta-phenylenediamine.

EXAMPLE 21

Amination of Aniline

Cataloreactant-Ni/Sr/Zr (1/0.05/0.2) - Effect of Oxygen (Ortho Directing)

The cataloreactant procursor is prepared in the same manner as described in Example 20 except that ammonium fluoride is omitted in the final wash. After drying in the circulating air oven for 16 hours at 105°C., 146.1 g. of a green solid are obtained. This is reduced with hydrogen as described in Example 25 except that an additional hour reduction at 480°C. with 100 ml. hydrogen per minute is carried out. After cooling to room temperature under 100 ml. nitrogen per minute the reduced material is poured from the reduction tube into a glass jar in the presence of air and stored in the jar until used.

A 110 ml. mild steel shaker tube is charged with 10 g. of the above product, 18.6 g. (0.2 mole) of aniline, 3.6 g. (0.2 mole) of distilled water, 17 g. (1 mole) of ammonia and 0.005 mole oxygen and heated 10 minutes at 350°C. with agitation as described in Example 1. After cooling and venting excess ammonia the tube contents are found to contain 0.753 g. of phenylenediamines. The phenylenediamine isomer distribution by weight is 55.7% ortho-, 3.3% para-, and 41.0% meta-phenylenediamine.

On repeating the experiment with an increased oxygen charge of 0.010 mole the phenylenediamine isomer distribution is 75.5% ortho-, 2.3% para-, and 22.2% meta-phenylenediamine.

EXAMPLE 22

Amination of Aniline

Cataloreactant-Ni/Zr (1/0.2) - Effect of Sr(OH)$_2$ Wash (Meta Directing)

A solution of 290.8 g. Ni(NO$_3$)$_2$.6 H$_2$O and 82.8 g. zirconyl nitrate in 3,000 ml. distilled water is mixed under good agitation with a solution containing 150.8 g. ammonium carbonate in 1500 ml. distilled water as described in Example 1. The resulting precipitate is filtered, washed twice with water and in a third wash with a solution of 10 g. of strontium hydroxide in 500 ml. of distilled water. The paste-like precipitate is dried at 100°C. overnight in a circulating air oven to give 147.0 g. of a solid green material which is broken up into largely ⅛ inch – ¼ inch granules and some fines and reduced in 4 portions as described in Example 1. The maximum temperature recorded during the exotherm period is 540°C. The portions of the black granular to fine powder, weighing 86 g. are combined and mixed in a single jar in the presence of air prior to use.

A 110 ml. mild steel shaker tube is charged with 20 g. of the a bove product, 18.6 g. aniline, 3.6 g. distilled water and 17 ml. of ammonia, heated at 350°C. for 7 minutes with agitation, cooled and vented in a manner similar to that of Example 1. The product contains 1.29 g. phenylenediamines, comprising by weight 74.5% meta-, 19.9% ortho-, and 5.6% para-phenylenediamine.

EXAMPLE 23

Diamino Toluene from Toluene and Toluidine

Ni/Sr/Zr(1/0.2/0.2) Cataloreactant

A Ni/.2Sr/.2Zr cataloreactant is prepared as described in Example 17. After the reduction the reduced material is cooled to room temperature by passing a 40 ml. air - 100 ml. nitrogen per minute gas stream through the tube; the amount of gray-black granular to fine powder is 96.1 g.

A 110 ml. shaker tube is charged with 10.7 g. m-toluidine, 9.2 g. toluene, 15 g. of the above powder, 0.9 g. distilled water, 17 g. ammonia and heated 10 minutes at 350°C. under autogeneous pressure with agitation as described in Example 17. After cooling the tube contents are found to contain 0.508 g. diaminotoluenes. Toluene, 2.0 mole percent, is converted to toluidines.

In another experiment is run identical to the above except that the water is omitted from the charge; the tube contents are found to contain 0.368 g. diaminotoluenes. Toluene, 5.8 mole percent, is converted to toluidines.

EXAMPLE 24

Aromatic Diamine from Benzene and Aniline Pelletted Cataloreactant-Ni/Sr/Zr (1/0.2/0.2)

A fine to granular glack powder Ni/.2Sr/.2Zr Cataloreactant is prepared essentially as described in Example 1. The product powder is place on a 10 mesh screen and reduced in size by grinding so that all of it passes through the screen. This is mixed by hand with 3% of its weight of finely divided polyethylene to obtain a well dispersed mixture. The polyethylene mix is placed in glass jars (less than one-half filled) and the mixture is agitated on a Fisher Mixer for 3 hours. At one-half hour intervals the jars are removed from the mixer and shaken by hand to further insure good dispersion of the polyethylene in the cataloreactant.

After 3 hours mixing the mixture is pelleted on a Stokes Pill Machine into pellets 3/16 inch in diameter and about 3/32 inch thick.

The pellets are then heated at 100° to 380°C. in a gas stream commencing with 2 ml. air/25 ml. nitrogen per minute and periodically increasing the amount of air to 5/20, 10/15, 15/10, 20/6 ratios and finally at 25/0 and 40/0 over an 8 hours, 45 minute period, to burn off the polyethylene.

After cooling to room temperature the pellets are reduced with hydrogen as described in Example 1 except that the temperature regulator is first set at 150°C. for one-half hour (instead of 380°C.) and the reduction is completed with the temperature regulator set at 400°C. and a temperature of at least 400°C. maintained 1 hour with a hydrogen flow of 100 ml./min. The maximum observed temperature during the reduction is 406°C. After the reduction the pellets are cooled to room temperature in a 100 ml. $N_2$/20 ml. air per minute gas stream, which requires 1 hour and 26minutes. The resulting pellets are then used in experiments such as the following.

A 110 ml. steel shaker tube is charged with 7.8 g. benzene, 18.6 g. aniline, 1.8 g. distilled water, 17 g. ammonia, and 10 g. of the above pellets, and heated 7 minutes at 350°C. under autogenous pressure with agitation as described in Example 1. Analysis of the tube contents shows that 0.707 grams of the aniline is converted to phenylenediamines and that 1.09 grams of the benzene is converted to aniline.

EXAMPLE 25

Aromatic Diamine from Benzene and Aniline-Ni/Sr/Zr(1/0.2/0.2) Cataloreactant-Effect of Higher Temperature Cataloreactant Oxidation (Meta Directing)

A solution containing 290.8 g. $Ni(NO_3)_2.6H_2O$, 42.3 g. $Sr(NO_3)_2$, and 82.8 g. zirconyl nitrate in 3,000 ml. distilled water is mixed under good agitation with a solution of 171 g. ammonium carbonate in 1500 ml. distilled water as described in Example 1. The resulting precipitate after filtering and washing is dried in a circulating air oven for 64 hours over a weekend at 70°C. to give 200.4 g. of green solid material. This is broken up and reduced in four portions essentially as described in Example 1; the highest temperature recorded during the reduction is 380°C. After cooling, respectively, to 40° and 68°C. under 100 ml. nitrogen/minute, the first two portions are subjected to a gas stream containing 50 ml. nitrogen and 2 ml. air per minute for a period of 20 minutes. During this time an exotherm occurs in both tubes raising the temperature to 67° and 90°C., respectively. The gas flow is then changed to 50 ml. nitrogen/10 ml. air per minute and held at this level 18 minutes, then to 50 ml. nitrogen/20 ml. air for 6 minutes, and finally to 50 ml. nitrogen/40 ml. air for 24 minutes. The maximum temperature recorded in these two tubes during this time is 135°C. and 172°C. The products in both tubes are combined in a glass jar in the presence of air prior to use in the following experiment.

A 110 ml. steel shaker tube is charged with 30 g. of the above product, 18.6 g. aniline, 3.12 g. benzene, 3.6 g. distilled water, and 17 g. ammonia, heated 7 minutes at 350°C. with agitation and cooled as described in Example 1. The tube is placed in an ice-water bath and brought to 0°C. before slowly venting the excess ammonia. The product contains 2.62 g. phenylenediamine, comprising by weight 71.5% meta-, 26.5% ortho-, and 2.0% para-phenylenediamine.

EXAMPLE 26

Aromatic Diamine from Benzene and Aniline Ni/Mg/Zr (1/0.2/0.2) Cataloreactant (Meta Directing)

A solution of 290.8 g. $Ni(NO_3)_2.6 H_2O$, 51.3 g. $Mg(NO_3)_2$-6 $H_2O$, 82.8 g. zirconyl nitrate, and 3,000 ml. distilled water is mixed under good agitation with a solution containing 176.2 g. ammonium carbonate in 1,500 ml. distilled water as described in Example 1. The resulting precipitate is filtered, washed and dried 15 hours, 10 minutes in a circulating air oven at 110°C. The resulting solid, 145.0 g., is broken up and reduced in a manner similar to that of Example 1.

The reduced material is postoxidized in the following manner. Following the reduction and after cooling to 62°C. under 100 ml. $H_2$, 10 ml. air is introduced into the nitrogen stream and the nitrogen is reduced to 50 ml/minute. There is an increase in the temperature to 68°C.; after 18 minutes the air flow is increased to 20 ml/minute and the bed temperature increases to 120°C. After 38 minutes at a flow of 50 ml. $N_2$/20 ml. air, the air is increased to 40 ml/minute. The temperature rises to 125°C; after 45 minutes at this air-nitrogen flow the gas stream is cut off and the product transferred through air to a glass jar and capped.

A 110 ml. mild steel shaker tube is charged with 40 g. of the above product, 18.6 aniline, 7.8 g. benzene, 3.6 g. distilled water, 17 g. ammonia and treated 12 minutes at 350°C. with agitation in the manner of Example 1. After cooling and venting the tube contents are found to contain 2.04 g. phenylenediamines. The product comprises by weight 80.9% meta-, 16.6% ortho-, and 2.5% para-phenylenediamine.

EXAMPLE 27

Aromatic Diamine from Benzene and Aniline-Cataloreactant-Ni/Sr/Zr (1/0.2/0.2) — Effect of NaOH Precipitation and Varying Oxidation of Cataloreactant A solution containing 145.4 g. $Ni(NO_3)_2.6 H_2O$, 21.2 g. $Sr(NO_3)_2$, and 41.4 g. zirconyl nitrate in 3000 ml. distilled water is mixed with a solution containing 62.4 g. NaOH in 3,000 ml. distilled water, the resulting precipitate is filtered and washed as in Example 1 except that the wash is carried out with 5–1000 ml. portions of distilled water. The precipitate is dried for 45 minutes in a circulating air oven and then for 22 hours and 40 minutes in a vacuum oven at 125°–140°C. to give 69.4 g. of dried product. This is broken up during the drying cycle into ¼ inch – ¾ inch particles and reduced with hydrogen in two portions A and B according to the procedure of Example 1 except that the initial temperature regulator setting is 150°C. for one-half hour and the final 1 hour of reduction with 100 ml. hydrogen per minute is carried out at 380°C. After this a flow of 100 ml. $N_2$ per minute is passed into the tube and the flow of hydrogen and furnace heaters are immediately shut off. After 5 minutes, air at the rate of 20 ml. per minute is introduced with 100 ml. nitrogen per minute into the tube containing portion A and the tube containing portion B is supplied with a gas stream containing 40 ml. per minute air with 40 ml. per minute nitrogen. The tubes are cooled to room temperature under these gas streams, the time required being 2 hours. The products A and B are used in the following experiments.

A 110 ml. mild steel shaker tube is charged with 27.3 g. of product A, 18.6 g. aniline, 3.6 g. distilled water, 7.8 g. of benzene and 17 g. ammonia, and heated 7 minutes at 350°C. with agitation as described in Example 1. After cooling, and venting the ammonia the tube contents are found to contain 2.8 g. phenylenediamines. The phenylenediamine isomer distribution by weight is 38.3% ortho-, 3.1% para-, and 58.6% meta-phenylenediamine.

On repeating the experiment but using 28.5 g. of product B, the phenylenediamine isomer distribution is 72.5% ortho-, 1.3% para-, and 26.2% meta-phenylenediamine. Analysis showed 1.34 grams phenylenediamines.

EXAMPLE 28

Aromatic Diamine From Benzene and Aniline - Ni/Al/Zr (1/0.5/0.1) Cataloreactant A solution of 290.8 g. of $Ni(NO_3)_2.6H_2O$, 187.6 g. of $Al(NO_3)_3.9H_2O$ and 41.4 g. of zirconyl nitrate in 3000 ml. of distilled water is mixed with a solution of 342.3 g. of ammonium carbonates in 1500 ml. of distilled water. The resulting precipitate is filtered, washed with water, dried and reduced with hydrogen as described in Example 1.

A 110 ml. mild steel shaker tube is charged with 29.7 g. of the above product, 18.6 g. of aniline, 2.7 g. of distilled water, 7.8 g. of benzene and 17 g. of ammonia and heated at 350°C. under autogenous pressure as described in Example 1. The phenylenediamine in the product amounts to 0.82 g. and comprises by weight 53.9% of ortho-, 3.4% of para- and 42.7% of meta-phenylenediamine.

EXAMPLE 29

Aromatic Diamine From Benzene and Aniline - Ni/Si(1/1) Cataloreactant

A solution of 290.8 g. of $Ni(NO_3)_2.6 H_2O$ and 200 g. of Ludox SM(Du Pont Co. 30% aqueous colloidal silica composition) in 3000 ml. of distilled water is mixed with a solution of 125.5 g. of ammonium carbonate in 1500 ml. of distilled water. The resulting precipitate is filtered, washed with water, dried and reduced with hydrogen as described in Example 1.

A mild steel shaker tube is charged with 15 g. of the above product, 9.3 g. of aniline, 7.8 g. of benzene, 3.6 g. of water and 17 g. of ammonia and heated at 350°C. for 12 minutes under autogenous pressure. The phenylenediamines in the product amount to 0.143 g. and comprise by weight 74.2% meta-, 5.5% para- and 20.3% ortho-phenylenediamines. The amount of benzene converted to aniline is 0.79 g.

On repeating the experiment except that water is omitted the phenylenediamines in the product amount to 0.139 g. and comprise by weight 76.6% meta-, 5.6% para- and 17.8% orthophenylenediamines. The amount of benzene converted to aniline is 0.046 g.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as set forth in the claims.

What is claimed is:

1. An improved process for aminating an aromatic compound selected from diphenyl ether, its monoamino derivatives, benzene, aniline and pyridine, which comprises reacting ammonia with said aromatic compound in the presence of from one mole percent to 250 mole percent of water based on the molar amount of the aromatic compound at a temperature of from 150°C. to 500°C. and at a pressure of from 10 to 1,000 atmospheres while the ammonia and the aromatic compound are in intimate molecular contact with a metallic nickel/nickel oxide cataloreactant containing a mole ratio of metallic nickel to nickel oxide of 0.001:1 to 10:1, the aromatic compound being miscible with ammonia at the temperature and pressure of the amination reaction.

2. The process of claim 1 wherein the cataloreactant contains a member selected from the group consisting of oxides and carbonates of zirconium, strontium, barium, calcium, magnesium, zinc, iron, titanium, aluminum, silicon, cerium, thorium, uranium and the alkali metals.

3. The process of claim 2 wherein the cataloreactant contains zirconium oxide.

4. The process of claim 3 wherein the mole ratio of total nickel to zirconium oxide expressed as total nickel to zirconium is 0.1:1 to 100:1.

5. The process of claim 1 wherein the temperature is 200°C. to 500°C.

6. The process of claim 1 wherein the pressure is 30 to 700 atmospheres.

7. The process of claim 1 wherein the aromatic compound is benzene.

8. The process of claim 1 wherein the aromatic compound is toluene.

9. The process of claim 1 wherein the aromatic compound is diphenyl ether.

10. The process of claim 1 wherein the aromatic compound is aniline.

11. The process of claim 1 wherein the aromatic compound is a mixture of an aromatic compound containing no amino groups and its monoamino derivative.

12. The process of claim 12 wherein the molar ratio of the monoamino derivative to the non-amino containing aromatic compound is from about 1:2 to 2:1.

13. The process of claim 7 wherein the molar percent of water is from 10 mole percent to 35 mole percent.

14. The process of claim 10 wherein the molar percent of water is from 10 mole percent to 175 mole percent.

* * * * *